US005491690A

United States Patent [19]
Alfonsi et al.

[11] Patent Number: 5,491,690
[45] Date of Patent: Feb. 13, 1996

[54] METHOD AND APPARATUS TO SPEED UP THE PATH SELECTION IN A PACKET SWITCHING NETWORK

[75] Inventors: Jean-Pierre Alfonsi, La Gaude; Claude Galand, Cagnes Sur Mer; Gerald Lebizay, Vence; Olivier Maurel, Le Cannet, all of France

[73] Assignee: International Business Machines Corporation, Armonk, N.Y.

[21] Appl. No.: 279,373

[22] Filed: Jul. 22, 1994

[30] Foreign Application Priority Data

Jul. 30, 1993 [EP] European Pat. Off. .............. 93480104

[51] Int. Cl.⁶ .................................................. H04L 12/56
[52] U.S. Cl. ............................................. 370/60; 370/94.3
[58] Field of Search .............................. 370/54, 58.1, 60, 370/60.1, 79, 84, 94.1, 94.3; 340/825.03, 827; 364/300, 200, 282.1

[56] References Cited

U.S. PATENT DOCUMENTS

| | | | |
|---|---|---|---|
| 4,827,411 | 5/1989 | Arrowood et al. | 364/200 |
| 5,081,620 | 1/1992 | Girard et al. | 370/60 |
| 5,115,433 | 5/1992 | Baran et al. | 370/94.3 |
| 5,142,531 | 8/1992 | Kirby | 370/94.3 |
| 5,216,591 | 6/1993 | Nemirovsky et al. | 370/16 |
| 5,233,604 | 8/1993 | Ahmadi et al. | 370/60 |
| 5,265,092 | 11/1993 | Soloway et al. | 370/60 |

OTHER PUBLICATIONS

Computer Networks, vol. 1, 1977, Amsterdam NL pp. 155–174 L. Kleinrock et al.
"Hierarchical Routing for Large Networks" paragraphs 1 and 2 IEEE Transactions on Computers, vol. 38, No. 8, Aug. 1989, New York, US pp. 1059–1074 XP47576.
W. T. Tsai et al "An Adaptive Hierarchical Routing Protocol" paragraphs I & II.A IEEE Jounral on Selected Areas in Communication, vol. 7, No. 8 Oct. 1989, New York US pp. 1243–1252 XP126342.
V. R. Sakensa "Topological Analysis of Packet Networks" Paragraphs I, II, and III.

*Primary Examiner*—Wellington Chin
*Assistant Examiner*—Ajit Patel
*Attorney, Agent, or Firm*—Gerald R. Woods

[57] ABSTRACT

Currently, routing algorithms compute all the available paths in the network, from a source node to a destination node before selecting the optimal route. The route computation is often time and resource consuming. Some paths are not acceptable due to the particular geographical configuration of the network. In the real world, large transport networks are not fully meshed. The present invention is based on the observation that networks are usually built around a hierarchical structure. A set of nodes, interconnected by high throughput lines, are used to build a 'Backbone' (401) with a high degree of meshing to allow the redundancy and reliability required by the user. The other nodes or 'local' nodes (404) are attached to one or several backbone nodes. It is the network designer responsibility, at the configuration time to define for each node what is its attribution: backbone (402) or local node (404). The list of the node attributions appears in the topology table (306) and is updated each time a node is added to or dropped from the network. The routing algorithm can take advantage of the particular network topology to drastically reduce the complexity of paths computation. For a given connection, only a limited number of nodes are eligible and are taken in account by the algorithm in the optimal route search. The object of the invention is to split the network into backbone and local nodes to speed up the path selection.

4 Claims, 9 Drawing Sheets

METHOD AND APPARATUS TO SPEED UP THE PATH SELECTION IN A PACKET SWITCHING NETWORK

TECHNICAL FIELD

The present invention relates to a high speed transmission system in a large packet switching network, more particularly, to an apparatus and method for speeding up the path selection between a source and a destination node and specifically a method to decompose the network into backbone and local nodes

BACKGROUND ART

It has become increasingly useful to interconnect a plurality of data processing elements by means of a packet switching network in which data is transmitted as data assemblages called "packets". Such networks include a plurality of interconnected switching nodes which, in turn, are connected to end nodes supporting data processing equipment. Such packet networks can become quite large with an extensive geographical distribution. In such a situation, the selection of an efficient path between two end nodes which wish to communicate with each other becomes of paramount importance. Different methods are summarized by H. Nussbaumer in *Teleinformatique II* (pages 92 to 117) *Presses Polytechniques Romandes* 1987.

PATH SELECTION

The general problem which must be solved at the network level is to find a path between a source and a destination node. When the network is using datagrams, the path selection must be done individually for each packet. For virtual circuits, the path decision is done once only at the time of the circuit establishment. In both cases, the choice of a routing algorithm is not easy because it must satisfy a large number of often conflicting requirements. This algorithm must be simple to implement to not complicate the nodes' execution. It must ensure a correct progress of the packets whatever the disturbance on the network. The algorithm must be able to provide satisfying results despite of traffic variations and the network topology. It must also ensure equity between the different end users and provide an equal distribution of the rights to access the network. At last, the routing algorithm must allow, when possible, the network to be exploited in an optimal way, according to a criterion which can vary with the utilization type. In most of the cases, the network is implemented in a way to minimize the packet transit time and to transfer the maximum number of packets. The principal objectives are respectively the reduction of the transit time and the increase of the throughput. In other cases, the objective is to decrease the communication cost, or to develop a reliable network able to operate correctly (without significant performance degradation) either in case of catastrophic line or node failure or peaks of traffic.

Because of the variety of the constraints, there are a large number of different routing types. Some apply to deterministic or adaptive policies in attempting to deal with traffic variations and network topology. Routing algorithms can be centralized if the paths are determined from a particular node. Others are distributed between all nodes; this is favorable in a reliability point of view but the algorithm is more complicated and the path optimization is more difficult to implement. Some Algorithms are difficult to classify as they use special techniques called Flooding Routing or Random Routing.

Flood Routing

The Flooding Routing is based on a very simple principle. Each node transmits packets on all output links of the node, except the input link. A node connected to K other nodes retransmits K–1 copies of the packet which has been just received. This method allows the delivery to the destination node of at least one copy of the packet with one condition. There must exist at least one path between the source to the destination node. This routing is ensured even when the network topology is changing, for example after a catastrophic failure of some components in the network. Flooding Routing allows a very good robustness in the network exploitation. Furthermore, as all possible links between the source and the destination node are tried in an exhaustive way, the method ensures that at least one copy of the packet will reach the recipient through the shorter path with the minimum delay if the network is not overloaded. This technique is simple to implement since neither routing tables to route the messages, nor knowledge of the geographical position of the destination node in the network are required. The recipient must only know that the packet is addressed to it.

The price to pay for these qualities of robustness, simplicity and rapidity is a poor utilization of the network resources and a tendency to congestion. Usually, it is advantageous to place in the packet header, a field indicating the maximum number of nodes that a packet is authorized to pass. This field is decremented each time the packet goes through a node, and packets with an empty field are discarded.

Random or Stochastic Routing

This technique, like Flooding Routing, does not require that the nodes have the complete knowledge of the network structure and of the traffic to make a routing decision at their own level. However, here, to limit the generation of significant ghost traffic, the nodes avoid sending copies of the packets they receive systematically over all output links. Random Routing consists of transmitting one or more counterparts of the received packet on output links selected at random. This method is also called Selective Flooding. This policy leads to a very simple routing at the node level and limits the saturation of the network due to the packet duplication. In return, the average routing delay is longer than this resulting from deterministic techniques. Packets may follow sinuous routes instead of taking the most direct path toward the destination node.

Deterministic Routing

Fixed Routing

Fixed Routing defines paths for different packets according to general network characteristics, such as the network topology and the mean traffic expected on the communication lines. The routing rules are established once and aim for optimizing the performance criterion for the benefit of the user. In most of the cases, the average packet transmission time through the network must be minimized. The method consists in building a routing table at the level of each node. The routing table allows the node to determine on which output link the packet it has just received must be transferred. Fixed Routing is very simple in its principles. The only processing done in the nodes consists in queues management and tables reading. The optimization algorithm is initiated only once at the network design level. Fixed Routing aims for a long term and a global optimization of the network, but in comparison with the random routing, this technique can considerably speed up packet transmission through the network.

Adaptive Routing

Contrary to Fixed Routing, the purpose of Adaptive Routing is to satisfy optimization criterion at any time. Tables are permanently updated according to, for example, the instantaneous state of the traffic on the lines.

Centralized Routing

When the characteristics of the network vary, it is possible to adapt the routing by assigning to one node the responsibility to update periodically the routing tables according to the traffic variations and the topology. This method, simple in its principles, is called Centralized Routing. Its principal disadvantage is that it generates significant auxiliary traffic and makes the efficiency of the network dependent on only one node. The different nodes must send to the routing center the state of the network as they perceive it (operational adjacent nodes, traffic . . . ), and the routing center must, in its turn, dispatch to the nodes their routing tables. The auxiliary traffic is concentrated around the routing center, which can result in saturation of the network. Furthermore, Centralized Routing can generate some problems at the time the tables are refreshed because the tables cannot be received at the same time by all of the nodes. A solution is to decentralize the tables establishment to the level of each node.

Local Routing

The local and distributed routing methods are both based on the establishment by each node of its own routing table according to information locally collected. With the local routing technique, each node builds its table without exchanging information with the neighboring nodes. In its most simple form, the method consists in placing the packet just received in the shortest output queue and in transmitting it as rapidly as possible. The local algorithm tends to circulate the packets very quickly in the network. However, as the routes are selected as a function of queue length, the mean path length is far from minimal.

Distributed Routing

Distributed Routing is a local method in which neighboring nodes exchange messages concerning the traffic and the network condition to update their routing and delay tables.

Hierarchical Routing

With non-Stochatic Routing methods, each node requires a table with as many rows as nodes in the network and a number of columns equal to the number of output links. Furthermore, when the routing is adaptive, nodes must exchange periodically messages to update their routing tables. The tables' size and the impact of the control messages increase rapidly with the number of nodes and become unacceptable when the network contains more than ten nodes. To solve this problem, the network is divided in a hierarchy of subnetworks as illustrated in FIG. 9. In particular, optimal clustering structures (003) are determined so as to minimize the length of the routing tables required. The tables take into account only the nodes in a subnetwork (003) and a packet addressed to a node in another subnetwork will necessarily go through the access node (005) of this remote subnetwork. Packets transit through some mandatory nodes (005). The price for this simplification is that smaller routing tables give less precise routing information, which can then result in longer path lengths for the message traffic. Hierarchical Routing procedures are particularly effective for large packet switched networks (001). With smaller routing tables, they require less storage and processing in the nodes (002) as well as less communications overhead in the lines (004).

The problem of the optimization of the hierarchical levels has been studied by L. Kleinrock and F. Kamoun—*Hierarchical Routing for Large Networks, Computer Networks*, Vol. 1, pp. 155–174, January 1977.

The main idea for reducing the routing table length is to keep, at any node, complete routing information about nodes which are close to it and less information about nodes located further away from it. This can be realized by providing one entry per destination for the closer nodes and one entry per set of destinations for the remote nodes. The reduction of routing table length is achieved through a hierarchical partitioning of the network. Basically, an m-level hierarchical clustering of a set of nodes (FIG. 9) consists in grouping the nodes (002) into a 1st level clusters (003), which in turn, are grouped into 2nd level cluster etc.

This operation continues in a bottom up fashion. The mth level cluster is the highest level cluster (3rd level cluster) and as such it includes all the nodes of the network (001). Unfortunately, the gains in table length are accompanied with an increase of the message path length in the network. This result in a degradation of the network performance (delay, throughput) due to the excess internal traffic caused by longer path length. However, in very large networks, an enormous table reduction may be achieved with no significant increase in network path length.

HIGH PERFORMANCE NETWORKS

The data transmission is now evolving with a specific focus on applications and by integrating a fundamental shift in the customer traffic profile. The data profile has become higher in bandwidth, bursting, non deterministic and requires more connectivity as a result of the growth of workstations, local area networks (LAN) interconnection, distributed processing between workstations and super computers, the new applications and the integration of various and often conflicting data structures—hierarchical versus peer to peer, wide (WAN) versus local (LAN) area networks, voice versus data. Based on the above, it is clear that there is strong requirement for supporting distributed computing applications across high speed networks that can carry LAN communications, voice, video, and traffic among channel attached hosts, business, engineering workstations, terminals, and small to intermediate file servers. This vision of a high speed multiprotocol network is the driver for the emergence of fast packet switching network architectures in which data, voice, and video information is digitally encoded, chopped into small packets and transmitted through a common set of nodes and links.

Throughput

A key requirement for these new architectures is to reduce the end-to-end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the packet processing time within each node. For example, for meeting a typical 100 ms delay to deliver a voice packet between two end users:

A total of 36 ms might be needed for the packetization and play-out functions at the end points.

About 20 ms is the unalterable propagation delay needed, say, to cross the United States.

There remains 44 ms for all the intra-node processing time as the packet moves through the network. In a 5 node network, each node would have about 8 ms for all processing time including any queuing time. In a 10 nodes network, each node would have about 4 ms.

Another way of looking the same constraint is illustrated in FIG. 1. Taking a node with an effective processing rate of 1 MIPS (Millions of Instructions Per Second), it is possible to fill a 9.6 kbps line with 1000 byte packets even if a network node must execute 833 000 instructions per packet processed. For a 64 kbps line the node can afford 125 000 instructions per packet. In order to fill an OC24 link, however, a 1 MIPS node could only execute 7 instructions per packet. In the latter case even an effective rate of 10–30 MIPS would allow only 70–200 instructions per packet.

In order to minimize the processing time and to take full advantage of the high speed/low error rate technologies, most of the transport and control functions provided by the new high bandwidth network architectures are performed on an end-to-end basis. The flow control and particularly the path selection are managed by the access points of the network, which reduces both the awareness and the function of the intermediate nodes.

Routing Modes

Routing within the network presents two aspects:

1. Determining what the route for a given connection shall be;
2. Actually switching the packet within a switching node.

There are many methods of determining a route through a network. For very high throughput, the critical item is that the switching elements must be able to decide where to route an incoming packet in a very short period of time. As described in the document entitled *High Speed Networking Technology, An Introductory Survey* (pages 88 to 96)-GG24-3816-00 ITSC Raleigh March 1992, the routing modes, the most widely used, are the Source Routing and the Label Swapping.

Source Routing

Source Routing is a particular implementation of Distributed Routing for connectionless network. The source node (or access node) is responsible for calculating the route the packet must take through the network. A routing field is appended to every packet sent and that field is used by the intermediate nodes to direct the packet towards its destination. In this technique, the sending node must know the network topology and it must be able to find the optimal route. But once the route is determined, intermediate nodes do not need to refer to any tables or parameters to make the routing decision. The next stage of the route is included in the packet header.

A drawback of this method is that the routing field in the packet header takes some storage and is an overhead. But this drawback is small and the benefits of being able to make a fast routing decision outweigh the small increase in bandwidth overhead. Since all routing information is contained in each packet a set up is not required along the path to provide an end to end communication. Thus, data applications which benefit from a datagram service can be effectively supported by this technique. However, datagram traffic is characterized by the fact that each datagram can be viewed as a connection and requires the computation of a path. Each packet is routed through the network as a self contained unit and is independent of all other packets. The key point for the source node is to determine for each datagram the optimal route with the shortest lapse of time.

Label Swapping

Label Swapping is a particular implementation of Distributed Routing for connection oriented networks. These networks typically multiplex many connections (or sessions) on a link using some form of logical "channel". Each packet sent on the link has a header which includes an arbitrary number identifying which logical connection that this packet belongs to. For example, each packet can contain in its routing field a label that will be used by the intermediate nodes to identify the transmission link the packet should be routed over. When a packet arrives at a node, the label is extracted from its header, and used to index a routing table that provides a new label along with a link address. The new label is over written on the old label, and the packet is forwarded using the link address. The information in the routing table is updated at the connection set up time. Each node on a path selects a label for each direction of the connection, and sends it to the neighboring node.

The call set up and the resource reservation process comprises the following steps:

A connection request is specified by the user via a set of parameters including origin and destination network address and data flow characteristics.

The path determination is realized by the source node from its local routing topology database.

The route reservation is sent out in a special message along the specified nodes. Said message, which is usually routed according to the previously described Source Routing technique, signals the nodes to set up their connection tables and to reserve their resources to provide the level of service required by the traffic type (for example, a bandwidth reservation on each of the links of the path).

The tables update reflects the changes in the availability of the network resources. The information is sent to every node in the network.

The Label Swapping technique requires that the connection tables be set up and maintained dynamically. That means that when a new connection is established or an old one is terminated the tables are updated (the database of network topology can of course be maintained quite separately). This is possible if the connection set up is relatively infrequent and is not too time critical. This restriction makes datagram transport quite inefficient. However, connections that require very short packets, like real-time voice connections, can be effectively supported by this technique, because of the low packet overhead. Once the connection is established, there is no need to place a destination address in the header every time a packet is sent. All is needed is a field to specify which connection is to be used for this packet.

Path Selection Criterion

One of the major criterion for selecting paths between nodes in packet networks is the minimum hop count and minimum path length. The hop count is the number of links used to construct the path between the two end nodes. The path length is a function of the overall transmission delay imposed by the path between the two end nodes. In most high speed networks, the delay (path length) is not a major consideration since the worst-case delay through such networks is nearly always acceptable. The hop count, however, is a direct measure of the amount of resources required to implement a given path and hence is of considerable importance in selecting paths. It is to be noted that a selected path need not be a minimum hop count path since congestion on the network links may force the choice of a larger hop count path. However, such longer alternate paths cannot be allowed to grow without limit since inordinate amounts of network resources might be committed to one path, resulting in further congestion for other paths and forcing yet longer hop count paths to be selected for yet other connections. The long term network throughput could thereby be adversely affected. The problem, then, is to select a path between an origin node and a destination node which has a hop count or a path length which does not utilize an inordinate amount of network resources.

Key Requirements

The Distributed Routing mechanism in large and high speed packet switching networks supporting both connection oriented and connectionless routing modes implies requirements in terms of performance and resource consumption which can be summarized as follows:

- the source node (or the node providing the route calculation for the source node) must be able to decide where to route an incoming packet in a very short portion of time (the computation must be sufficiently rapid to compute an optimum path for each connection request)
- the switching time in the intermediate nodes must be minimized, (minimum processing time)
- the network resources along the selected path must be optimized according to the criterion of the minimum hop count.
- Control messages must be, as much as possible, limited so as not to overload the network.

In high speed networks the cost for updating the routing tables generated by the exchange of control messages is not critical so long as this can be performed before the connection set up. The very high line throughput supports the interchanging of routing information without creating a significant burden on the communication lines themselves. These considerations suggest a better access and use of the routing tables maintained within the nodes without sacrificing the criterion of optimal path contrary to the Hierarchical Routing method proposed by L. Kleinrock and F. Kamoun.

Summary of the Invention

Currently, the routing algorithms compute all the available paths in the network, from the source node to the destination node before selecting the optimal route. No assumption is made on the network topology and the route computation is often time and resource consuming. For example, some paths which are calculated are not acceptable due to the particular geographical configuration of the network.

In the real world, large transport networks are not fully meshed. The present invention is based on the simple observation that networks are usually built around a hierarchical structure. A set of nodes, interconnected by high throughput lines, are used to build a 'Backbone' with a high degree of meshing to allow the redundancy and reliability required by the user. The other nodes or 'local' nodes are attached to one or several backbone nodes. It is the network designer responsibility, at the configuration time to define for each node what is its attribution: backbone or local node. The list of the node attributions appears in the topology table and is updated each time a node is added to or dropped from the network. The routing algorithm can take advantage of the particular network topology to drastically reduce the complexity of paths computation. For a given connection, only a limited number of nodes are eligible and are taken in account by the algorithm in the optimal route search. The object of the invention is to split the network in backbone and local nodes to speed up the path selection.

DESCRIPTION OF THE PREFERRED EMBODIMENT

Figure 1:
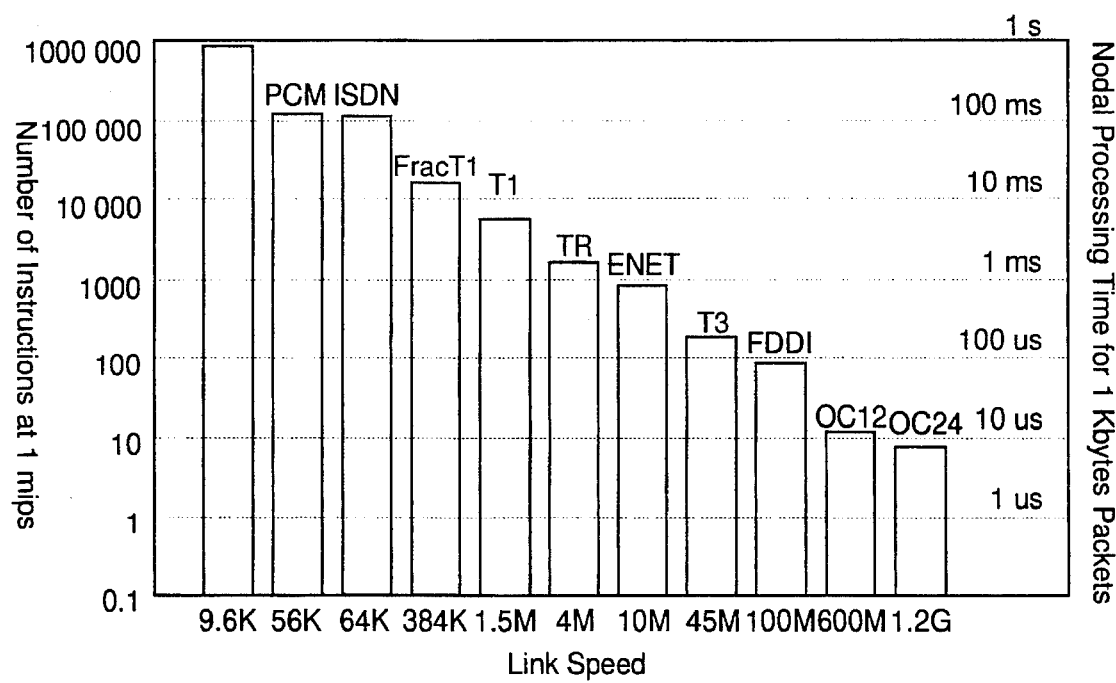
FIG. 1 shows the processing times (or number of instructions per second) required in function of the different line throughputs supported by the high speed networks.
Figure 2:
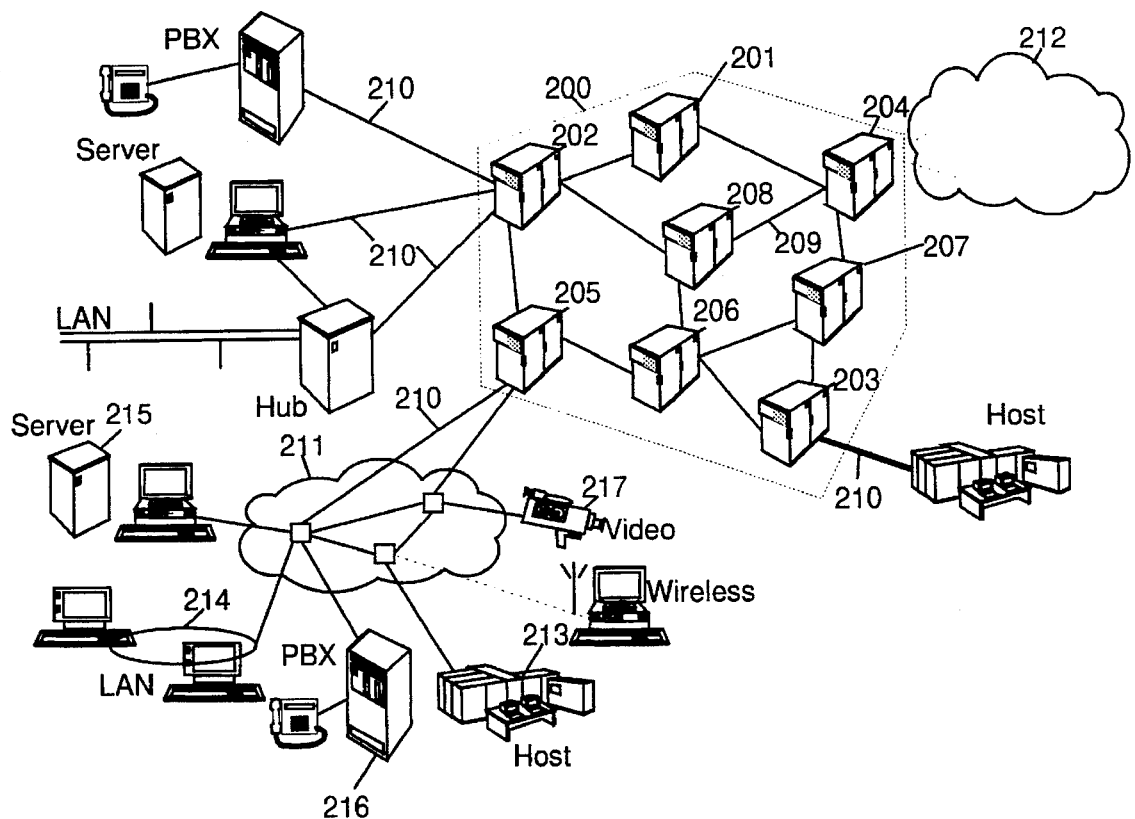
FIG. 2 shows a typical model of high speed packet switching network including access and transit nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as enterprise servers (213), user groups using workstations or personal computers attached on LAN (Local Area Networks 214), applications servers (215), PBX (Private Branch exchange 216) or video servers (217). These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer and to that end, the transmission, routing and switching techniques within the nodes are optimized to process the flowing packets towards their final destination at the highest possible rate. The present invention belongs essentially to the latter category and more particularly to the fast packet switching network architecture detailed in the following paragraphs.

High Speed Packet Switching Networks

The general view in FIG. 2 shows a fast packet switching transmission system comprising eight nodes (201 to 208), each node being interconnected by means of high speed communication lines called Trunks (209). Access (210) to the high speed network by users is realized through Access Nodes (202 to 205) located at the periphery. These Access Nodes have one or more Ports, each one providing an access point for attaching external devices, supporting standard interfaces to the network and performing the conversions required to transport the users' data flow across the network from and to other external devices. For example, Access Node 202 interfaces with a Private Branch exchange (PBX), an application server and a hub through three Ports and communicates through the network by means of the adjacent Transit Nodes 201, 208 and 205.

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originated in the node, directory services like retrieving and updating information about network users and resources, the maintaining of a consistent view of the physical network topology, including link utilization information, and the reservation of resources at access points of the network.

Each Port is connected to a plurality of user processing equipments, each user equipment comprising either a source of digital data to be transmitted to another user system, or a data sink for consuming digital data received from another user system, or, typically, both. The interpretation of the user protocols, the translation of the user data into packets formatted appropriately for their transmission on the packet network (200) and the generation of a header to route these packets are executed by an Access Agent running in the Port. This header is made of Control and Routing Fields.

The Routing Fields contain all the information necessary to route the packet through the network (200) to the destination node to which it is addressed.

The Control Fields include, among other things, an encoded identification of the protocol to be used in interpreting the Routing Field (Source Routing, Label Swapping, etc.).

Routing Points

Figure 3:
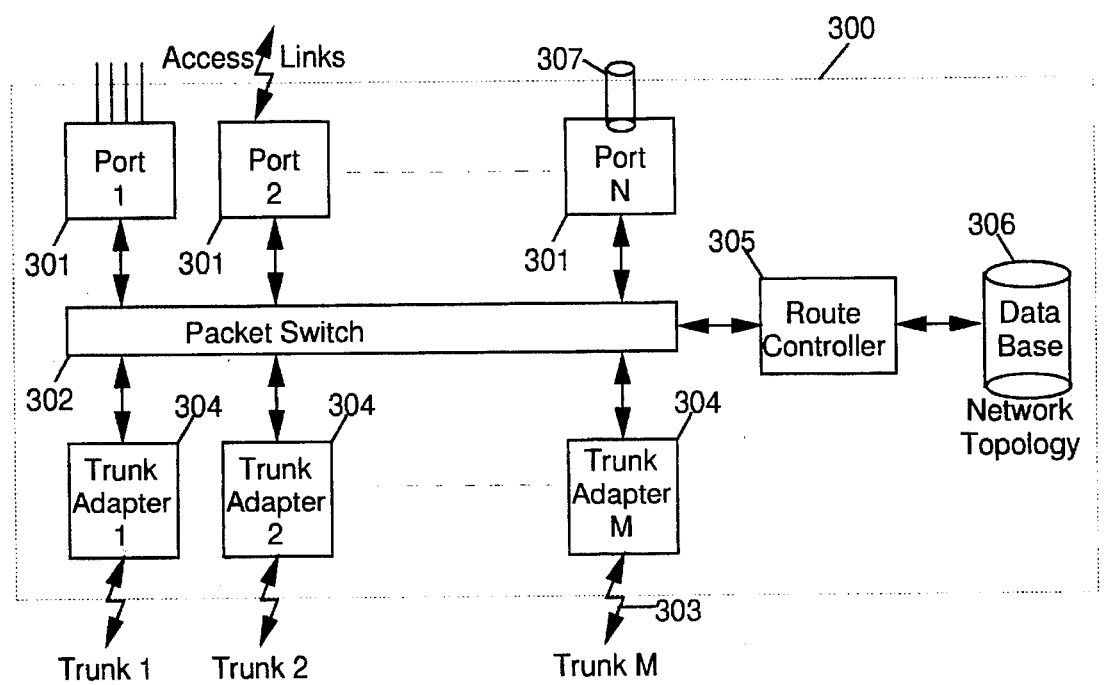
FIG. 3 describes a high speed Routing Point according to the present invention.

FIG. 3 shows a general block diagram of a typical Routing Point (300) as it can be found in the network nodes (201 to 208) illustrated in FIG. 2. A Routing Point comprises a high speed packet Switch (302) into which packets arriving at the Routing Point are entered. Such packets are received:

from other nodes over high speed transmission links (303) via Trunk Adapters (304).

from users via application adapters called Ports (301).

Using information in the packet header, the adapters (304, 301) determine which packets are to be routed by means of the Switch (302) towards a local user network (307) or towards a transmission link (303) leaving the node. The adapters (301 and 304) include queuing circuits for queuing packets prior to or subsequent to their launch on the Switch (302).

The Route Controller (305) calculates the optimum routes through the network (200) so as to satisfy a given set of quality of service criteria specified by the user and to minimize the amount of network resources used to complete a communication path. Then, it builds the header of the packets generated in the Routing Point. The optimization criteria includes the number of intermediate nodes, the characteristics of the connection request, the capabilities and the utilization of the Trunks in the path. All the information necessary for the routing, about the nodes and transmission links connected to the nodes, are contained in a Network Topology Database (306). Under steady state conditions, every Routing Point has the same view of the network. The network topology information is updated when new links are activated, new nodes added to the network, when links or nodes are dropped or when link loads change significantly. Such information is originated at the network node to which the resources are attached and is exchanged by means of control messages with all other Route Controllers to provide the up-to-date topological information needed for route calculation (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point as dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

NETWORK DECOMPOSITION

Modified Bellmann-Ford Algorithm

There are several possible algorithms to compute an optimal route in a network. The modified Bellmann-Ford algorithm is one of the most currently used in fast packet switching networks. As described in European Patent Application 93480030.1—*Methods and Apparatus for Optimum Path Selection in Packet Transmission Networks*, this one is invoked for each connection with the following parameters:

the source node address, the destination node address, the quality of service required for the connection. For example:

maximum call set up delay (very important parameter for connections serviced in real time),
maximum end to end transit delay,
maximum information loss, error probability, The algorithm uses in the source node (or access node), the local copy of the network topology to determine the minimum hop and path length with the destination node which meets the quality of service requirements. As mentioned, the modified Bellman-Ford algorithm makes no assumption on the network geographical configuration and it requires the same complexity whether the network is fully meshed or hierarchized. The purpose of the present invention is, for a given connection, to simplify the network topology by reducing the number of eligible nodes for the path calculation.

Algorithm Complexity

The total hop count necessary from a given node to reach all the other nodes gives a measure of the complexity C of the path selection according to the minimum hop criterion. C is proportional to the average number of links $l$ per node, to the total number of nodes N in the network and to the average number of optimal hops.

$$C = N \times \quad 1.1\,(N-1)/N \quad 0 \quad + \text{(first hop)}$$
$$2.1\,(N-1)/N \quad 1 \quad + \text{(second hop)}$$
$$3.1\,(N-1)/N \quad 2 \quad + \text{(third hop)}$$
$$\ldots$$
$$(i+1)\cdot 1\,(N-1)/N \quad i \quad \text{($i+1$ th hop)}$$

$$C = hopt \cdot N \cdot 1$$
$$= hopt \cdot N \cdot 2 \cdot L/N = hopt \cdot 2L \text{ with:}$$

$hopt$ = average hop count for an optimal path
$l$ = average number of links per node
$N$ = total number of nodes in the network
$L$ = total number of links in the network The complexity is directly related to the total number of links in the network. For a given path search between two nodes, the complexity can be reduced in a very large proportion by pre-selecting the links that will be used for the computation of the route. This pre-selection is efficient if the minimum hop number criterion is not degraded in the same proportion, that means if hopt remains constant.

Nodes and Links Attributes

The basic idea of the present invention is to pre-select in a given node the physical links which must be considered for building a path to another node and then to use the pre-selectedlinks at path selection time. This invention details also, how to initiate and maintain the link table.

Some nodes are selected to build a backbone. The other nodes, called local nodes, are attached to at least one node of this backbone. Both local and backbone nodes are able to support Ports and trunks, without any restriction. The node attributes are recorded in the topology database and updated for each change in the network, node addition or node suppression. Based on the node attributes, each link is qualified by a new attribute, according to the following rules:

| Node i | Node j | Link ij Type |
|---|---|---|
| Backbone | Backbone | Backbone |
| Backbone | Local | Local |
| Local | Backbone | Local |
| Local | Local | Local |

These link attributes are not defined by the network designer. They are dynamically built by each node, according to the Node i and Node j types.

The classification of the nodes can be done according to one of the following methods:
- by hand in case of small networks. The search of the path from the source to the destination node is limited to the backbone level, all possible search through the local network are eliminated.
- by using off-line a path selection algorithm for each possible source-destination.

Topology Database

The topology database is replicated in every node and contains information on the network nodes and links. A topo/kogy algorithm is used to maintain a consistent view of the network in all nodes. The topology database contains two classes of information:
- The physical topology of the network including static information like physical characteristics of nodes and links,
- The link utilization.

Only the first class of parameters are related to the present invention.

Assumptions

The network comprises N nodes and L links,
Every node has the same knowledge of the network topology.

Definitions

In a given node (Node i), a simple matrix structure must be built to determine which links have to be used to reach any other node (Node j). This matrix structure can be defined as follows:
There is a line for each link $l$, and a column for each node of the network. The so defined structure is a L×N matrix.
The matrix element, Eln, is a Boolean value:
  Eln=1 (TRUE) means: Link $l$ can be used to reach Node n from Node i
  Eln=0 (FALSE) means: Link $l$ cannot be used to reach Node n from Node i

Matrix Initiation

The matrix is defined, at the configuration time, independently in each node, according to the following principles:
Links (or matrix lines)
  The links going from Node_i to the backbone nodes are all usable to reach other nodes (except Node i itself),
  The links between any backbone nodes are all usable to reach any destination in the network.

The other local links (not directly attached to Node i) are usable only to reach the local node(s) they are attached to.

Nodes (or matrix columns). In Node j column,
All backbone links are usable,
All links attached to Node i or/and Node j are usable
All other links are not usable.

Matrix Update

Each time a new node or link is added, the topology database located in every node of the network must be updated. This is done by means of control messages containing the new topology and particularly the attributes of the new node. The matrix is updated according to the following rules:

The addition of a new local Node k involves the addition of a new column with a:
value 1 (TRUE) for backbone links and links attached to Node i and/or Node k.
value 0 (FALSE) for all other local links The addition of a new backbone Node k involve the addition of a column with a:
value 1 (TRUE) for the backbone links, and links attached to Node i.
value 0 (FALSE) for all other local links The addition of a new local link Ljk involves the addition of a new row with a:
VALUE 1 (TRUE) for the local node j or k if that link is not directly attached to Node i,
value 1 (TRUE) for all nodes (except Node i) if that link is directly attached to Node i,
value 0 (FALSE) for all other nodes.

the addition of a new backbone link Ljk involves the addition of a new row in the matrix with a 1 value (TRUE) for all nodes (except Node i).

Optimal Path Search Methodology

Figure 8:
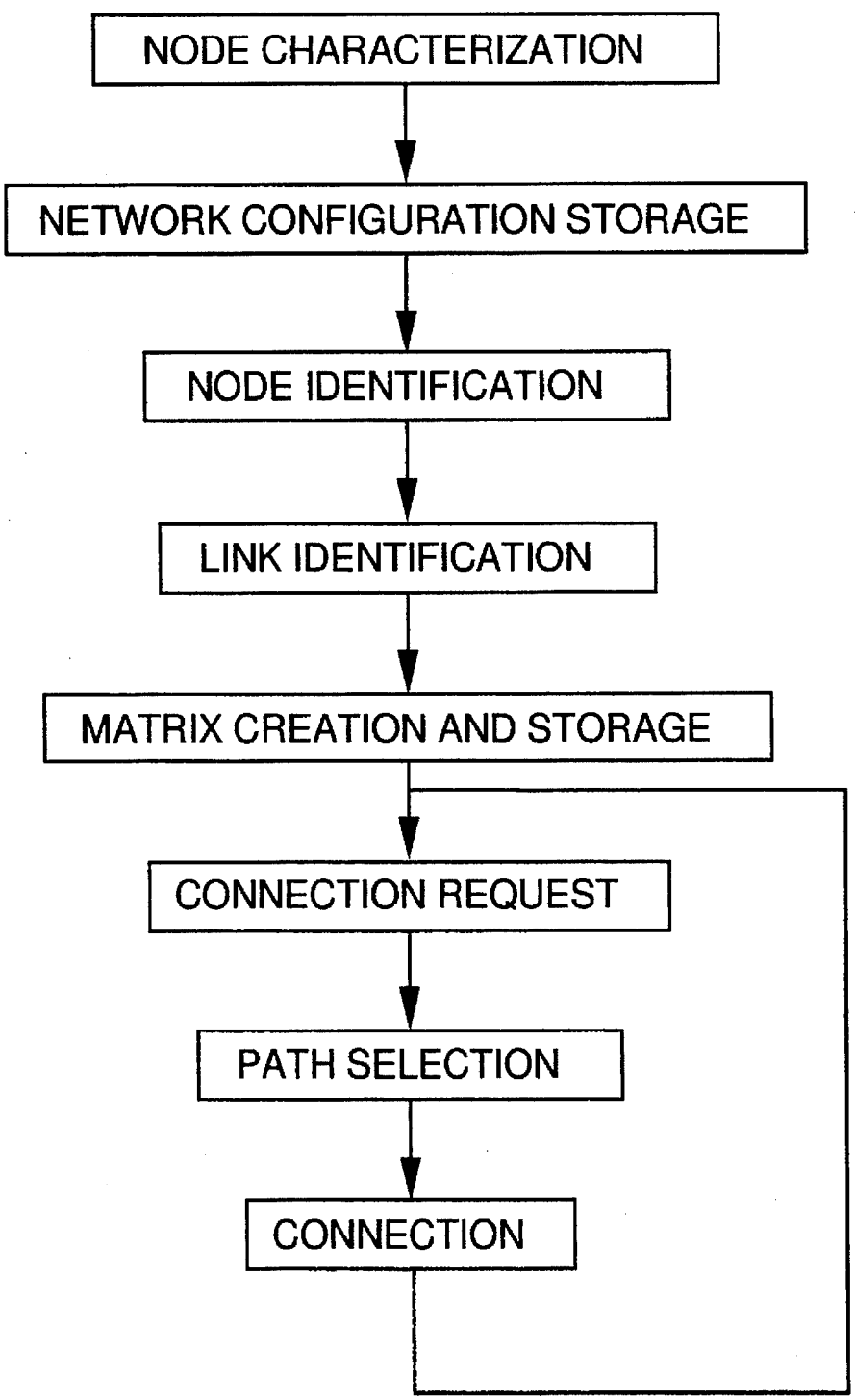
FIG. 8 summarizes the path selection methodology according to the present invention.
Figure 9:
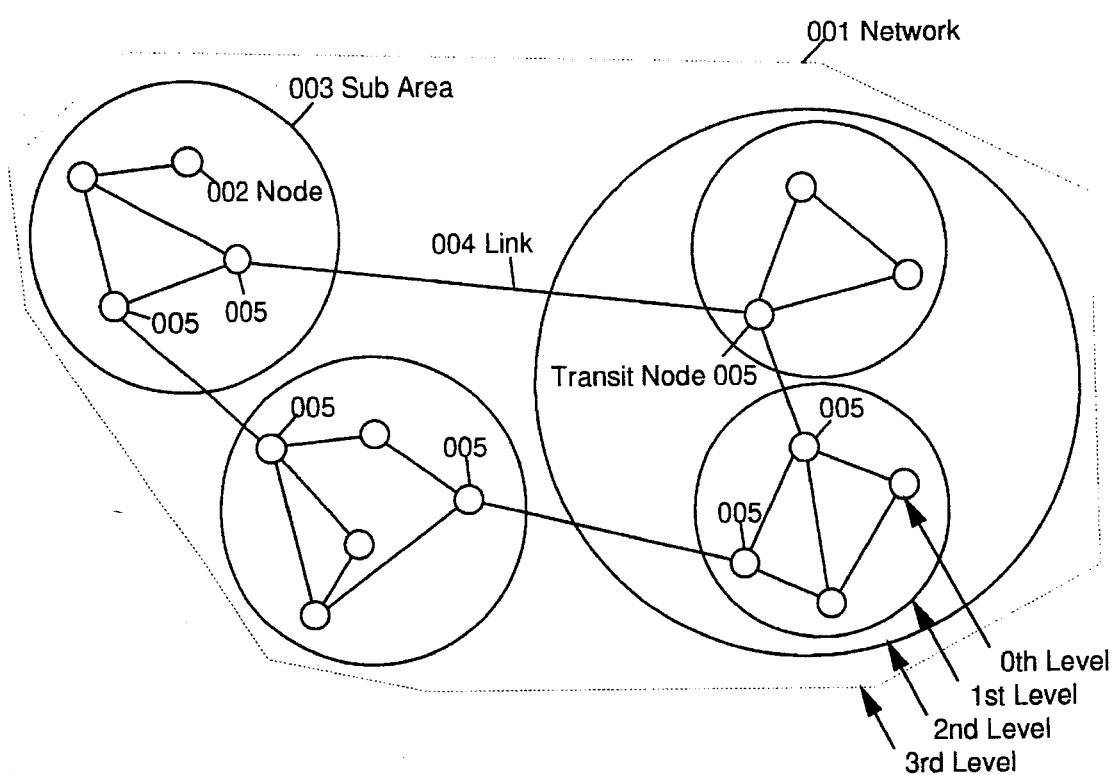
FIG. 9 represent a network topology for Hierarchical Routing according to the method suggested in the prior art by L. Kleinrock and F. Kamoun.

The method according to the present invention can be summarized as follows (FIG. 8):

Step 1: The node is characterized with an attribute: the node is defined as backbone or local node.

Step 2: The node stores the network configuration in its topology database. This database is initiated and maintained by means of control messages exchanges between all the nodes in the network.

Step 3: From the information stored in the topology database, the node identifies the backbone and the local nodes.

Step 4: The node determines the attribute of each link according to the node attributes.

Step 5: The node selects the usable links for each destination node in the network by building a L×N matrix.

Step 6: At each connection request, the routing algorithm is computed among the set of pre-selected usable links.

Step 7: During all the time of the connection, the data packets are sent to the destination node along the path previously computed.

Example

Figure 4:
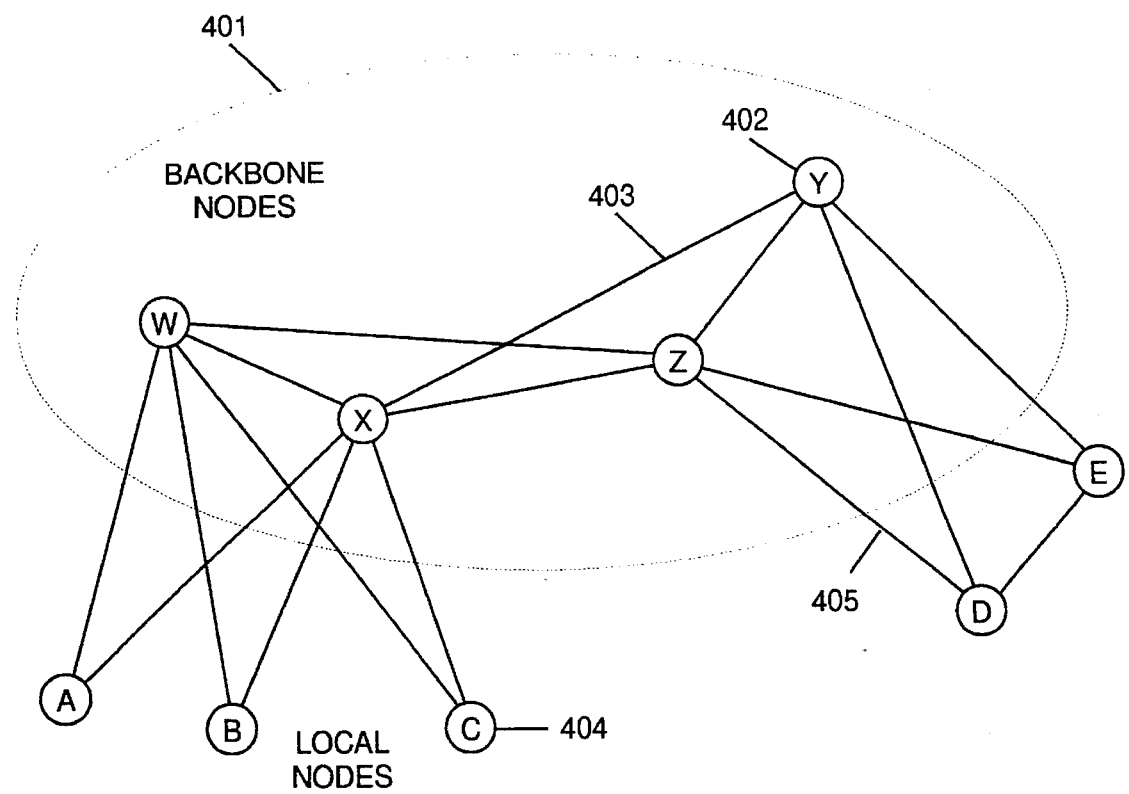
FIG. 4 illustrates the decomposition of the network into a plurality of backbone nodes and local nodes according to the present invention.

As illustrated in FIG. 4, the network is decomposed at the configuration time, in a plurality of backbone (401) and local nodes:

Backbone nodes (402): W,X,Y,Z

Local nodes (404): A,B,C,D,E and

Backbone links (403): Lwx,Lwz,Lxy,Lxz,Lyz,

Local Links (405): Law,Lax,Lbw,Lbx,Lcw,Lcx, Ldy,Ldz,Lde,Ley,Lez

The corresponding matrix for the node A is:

| Nodes Links | A | B | C | D | E | W | X | Y | Z |
|---|---|---|---|---|---|---|---|---|---|
| Law | 0 | 1 | 1 | 1 | 1 | 1 | 1 | 1 | 1 |
| Lax | 0 | 1 | 1 | 1 | 1 | 1 | 1 | 1 | 1 |
| Lbw | 0 | 1 | 0 | 0 | 0 | 0 | 0 | 0 | 0 |
| Lbx | 0 | 1 | 0 | 0 | 0 | 0 | 0 | 0 | 0 |
| Lcw | 0 | 0 | 1 | 0 | 0 | 0 | 0 | 0 | 0 |
| Lcx | 0 | 0 | 1 | 0 | 0 | 0 | 0 | 0 | 0 |
| Ldy | 0 | 0 | 0 | 1 | 0 | 0 | 0 | 0 | 0 |
| Ldz | 0 | 0 | 0 | 1 | 0 | 0 | 0 | 0 | 0 |
| Lde | 0 | 0 | 0 | 0 | 0 | 0 | 0 | 0 | 0 |
| Ley | 0 | 0 | 0 | 0 | 1 | 0 | 0 | 0 | 0 |
| Lez | 0 | 0 | 0 | 0 | 1 | 0 | 0 | 0 | 0 |
| Lwx | 0 | 1 | 1 | 1 | 1 | 1 | 1 | 1 | 1 |
| Lwz | 0 | 1 | 1 | 1 | 1 | 1 | 1 | 1 | 1 |
| Lxy | 0 | 1 | 1 | 1 | 1 | 1 | 1 | 1 | 1 |
| Lxz | 0 | 1 | 1 | 1 | 1 | 1 | 1 | 1 | 1 |
| Lyz | 0 | 1 | 1 | 1 | 1 | 1 | 1 | 1 | 1 |

Figure 5:
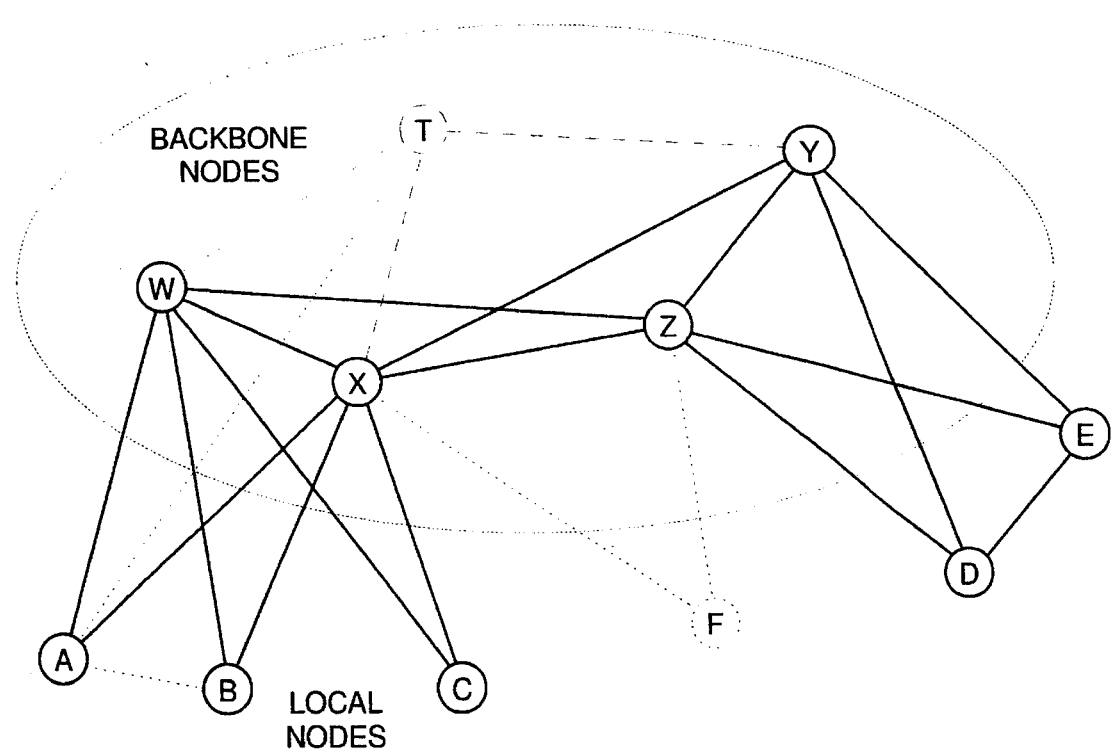
FIG. 5 illustrates the addition in the network of new nodes and links and their classification in the topology database according to the present invention.

FIG. 5 shows the example of the addition in the network of two nodes: a local node F and a backbone node T with the:

new backbone links: Ltx,Lty,Ltw and new local links: Lfx,Lfz,Lat,Lab

The matrix is updated accordingly as illustrated hereunder:

| Nodes Links | A | B | C | D | E | W | X | Y | Z | F | T |
|---|---|---|---|---|---|---|---|---|---|---|---|
| Law | 0 | 1 | 1 | 1 | 1 | 1 | 1 | 1 | 1 | 1 | 1 |
| Lax | 0 | 1 | 1 | 1 | 1 | 1 | 1 | 1 | 1 | 1 | 1 |
| Lbw | 0 | 1 | 0 | 0 | 0 | 0 | 0 | 0 | 0 | 0 | 0 |
| Lbx | 0 | 1 | 0 | 0 | 0 | 0 | 0 | 0 | 0 | 0 | 0 |
| Lcw | 0 | 0 | 1 | 0 | 0 | 0 | 0 | 0 | 0 | 0 | 0 |
| Lcx | 0 | 0 | 1 | 0 | 0 | 0 | 0 | 0 | 0 | 0 | 0 |
| Ldy | 0 | 0 | 0 | 1 | 0 | 0 | 0 | 0 | 0 | 0 | 0 |
| Ldz | 0 | 0 | 0 | 1 | 0 | 0 | 0 | 0 | 0 | 0 | 0 |
| Lde | 0 | 0 | 0 | 0 | 0 | 0 | 0 | 0 | 0 | 0 | 0 |
| Ley | 0 | 0 | 0 | 0 | 1 | 0 | 0 | 0 | 0 | 0 | 0 |
| Lez | 0 | 0 | 0 | 0 | 1 | 0 | 0 | 0 | 0 | 0 | 0 |
| Lwx | 0 | 1 | 1 | 1 | 1 | 1 | 1 | 1 | 1 | 1 | 1 |
| Lwz | 0 | 1 | 1 | 1 | 1 | 1 | 1 | 1 | 1 | 1 | 1 |
| Lxy | 0 | 1 | 1 | 1 | 1 | 1 | 1 | 1 | 1 | 1 | 1 |
| Lxz | 0 | 1 | 1 | 1 | 1 | 1 | 1 | 1 | 1 | 1 | 1 |
| Lyz | 0 | 1 | 1 | 1 | 1 | 1 | 1 | 1 | 1 | 1 | 1 |
| Lfx | 0 | 0 | 0 | 0 | 0 | 0 | 0 | 0 | 0 | 1 | 0 |
| Lfz | 0 | 0 | 0 | 0 | 0 | 0 | 0 | 0 | 0 | 1 | 0 |
| Ltx | 0 | 1 | 1 | 1 | 1 | 1 | 1 | 1 | 1 | 1 | 1 |
| Lty | 0 | 1 | 1 | 1 | 1 | 1 | 1 | 1 | 1 | 1 | 1 |
| Ltw | 0 | 1 | 1 | 1 | 1 | 1 | 1 | 1 | 1 | 1 | 1 |
| Lat | 0 | 1 | 1 | 1 | 1 | 1 | 1 | 1 | 1 | 1 | 1 |
| Lab | 0 | 1 | 1 | 1 | 1 | 1 | 1 | 1 | 1 | 1 | 1 |

To simplify the notation, the matrix in Node i is represented as a L entry table Ti(k) (k=1, . . . ,L) with:

Ti(k)=1 when link k is usable for any path,

Ti(k)=0 when link k is not usable for any path,

Ti(k)=j when the link k is usable only on the path from Node i to Node j (j=1, . . . ,N except i)).

In our example, the tables Ti in nodes A to Z have the following values:

| Links | TA | TB | TC | TD | TE | TF | TT | TW | TX | TY | TZ |
|-------|----|----|----|----|----|----|----|----|----|----|----|
| Law   | 1  | A  | A  | A  | A  | A  | A  | A  | A  | A  | A  |
| Lax   | 1  | A  | A  | A  | A  | A  | A  | A  | A  | A  | A  |
| Lbw   | B  | 1  | B  | B  | B  | B  | B  | B  | B  | B  | B  |
| Lbx   | B  | 1  | B  | B  | B  | B  | B  | B  | B  | B  | B  |
| Lcw   | C  | C  | 1  | C  | C  | C  | C  | C  | C  | C  | C  |
| Lcx   | C  | C  | 1  | C  | C  | C  | C  | C  | C  | C  | C  |
| Ldy   | D  | D  | D  | 1  | D  | D  | D  | D  | D  | D  | D  |
| Ldz   | D  | D  | D  | 1  | D  | D  | D  | D  | D  | D  | D  |
| Lde   | 0  | 0  | 0  | E  | D  | 0  | 0  | 0  | 0  | 0  | 0  |
| Ley   | E  | E  | E  | E  | 1  | E  | E  | E  | E  | E  | E  |
| Lez   | E  | E  | E  | E  | 1  | E  | E  | E  | E  | E  | E  |
| Lwx   | 1  | 1  | 1  | 1  | 1  | 1  | 1  | 1  | 1  | 1  | 1  |
| Lwz   | 1  | 1  | 1  | 1  | 1  | 1  | 1  | 1  | 1  | 1  | 1  |
| Lxy   | 1  | 1  | 1  | 1  | 1  | 1  | 1  | 1  | 1  | 1  | 1  |
| Lxz   | 1  | 1  | 1  | 1  | 1  | 1  | 1  | 1  | 1  | 1  | 1  |
| Lyz   | 1  | 1  | 1  | 1  | 1  | 1  | 1  | 1  | 1  | 1  | 1  |
| Lfx   | F  | F  | F  | F  | F  | 1  | F  | F  | F  | F  | F  |
| Lfz   | F  | F  | F  | F  | F  | 1  | F  | F  | F  | F  | F  |
| Ltx   | 1  | 1  | 1  | 1  | 1  | 1  | 1  | 1  | 1  | 1  | 1  |
| Lty   | 1  | 1  | 1  | 1  | 1  | 1  | 1  | 1  | 1  | 1  | 1  |
| Ltw   | 1  | 1  | 1  | 1  | 1  | 1  | 1  | 1  | 1  | 1  | 1  |
| Lat   | 1  | A  | A  | A  | A  | A  | A  | A  | A  | A  | A  |
| Lab   | B  | A  | 0  | 0  | 0  | 0  | 0  | 0  | 0  | 0  | 0  |

Figure 6:
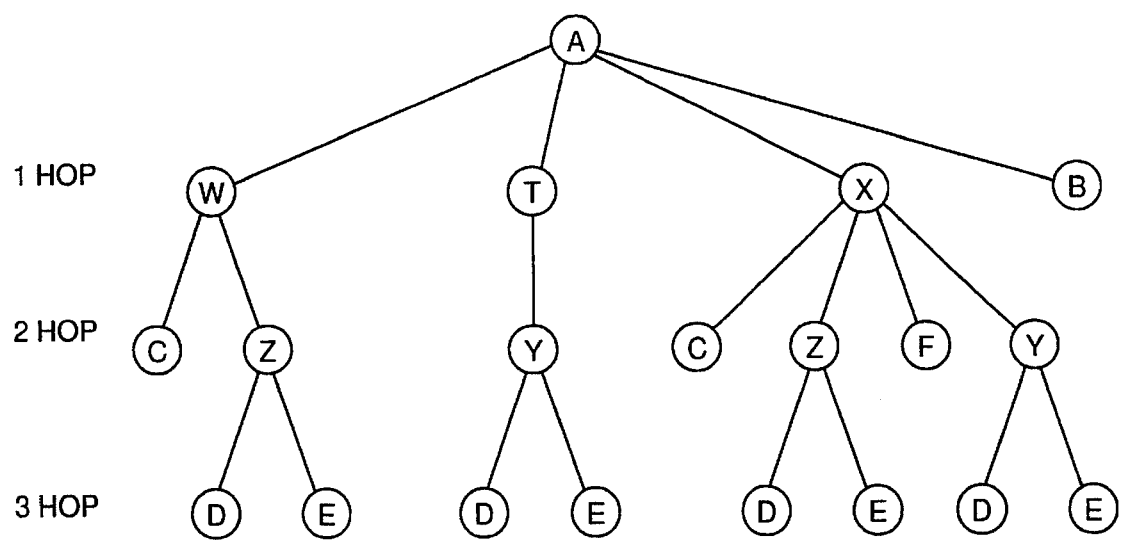
FIG. 6 represents the optimum path tree of node A.
Figure 7:
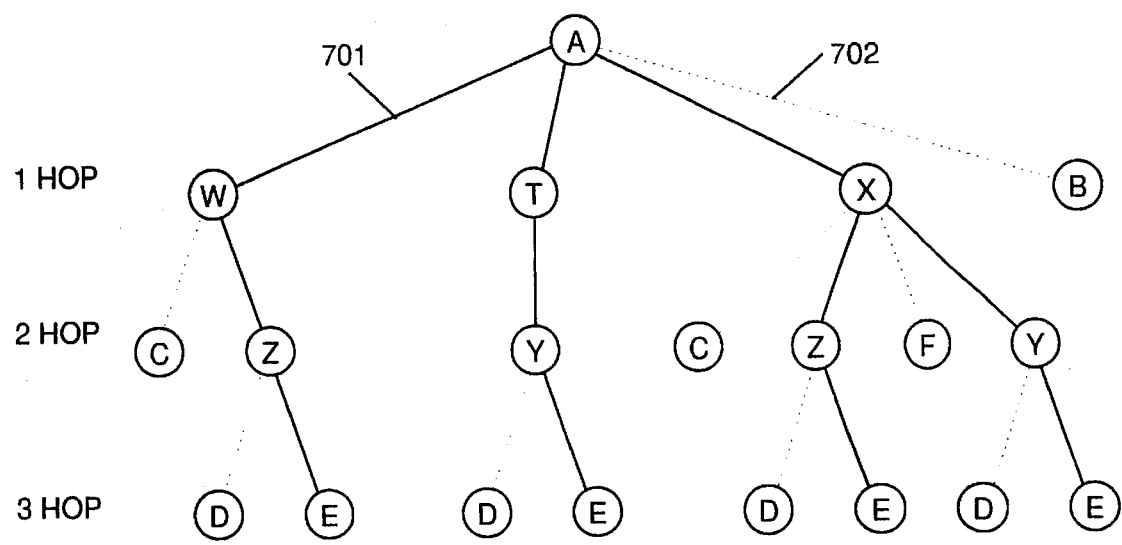
FIG. 7 represents the optimum path tree of node A according to the present invention.

The path between two nodes in the network is considered as optimum if the number of hops is minimum. All optimum paths create a tree of which root is the source node. FIG. 6 shows all the optimum paths established from node A. At the first level are placed all nodes adjacent to the source node, then at the second level all the adjacent nodes to the first level nodes and not already placed and so on until exhaustion. FIG. 7 illustrates the path search from node A to node E according to the present invention. As previously described, the eligible links to reach node E are defined in the table TA.

| Eligible | | Non-Eligible | |
|----------|----|----|----|
| Links | TA | Links | TA |
| Law | 1 | Lbw | B |
| Lax | 1 | Lbx | B |
| Lat | 1 | Lcw | C |
| Ley | E | Lcx | C |
| Lez | E | Ldy | D |
| Lwx | 1 | Ldz | D |
| Lwz | 1 | Lde | 0 |
| Lxy | 1 | Lfx | F |
| Lxz | 1 | Lfz | F |
| Lyz | 1 | Lab | B |
| Ltx | 1 | | |
| Lty | 1 | | |
| Ltw | 1 | | |

Only the backbone links, and the local links attaching the source node and the destination node to the backbone (701) are taken into account in the search process. The other links (702) are not taking part to the path selection which reduces the complexity of the routing algorithm computation (for example the Bellman-Ford Algorithm). In our example, four paths—AWZE, ATYE, AXZE, AXYE—are satisfying the minimal hop constraint with a number of three hops. The complexity of the network represented in FIG. 5 can be approximated as follows:

C=hopt. 2L=1.69×(2×23)=77.7 with:
hopt=1.69 hops
L=23 links
N=11 nodes
l=4.18 (46/11) links per node The average hop number is determined from all the optimum (minimum) paths between the nodes:

1 hop: AW, AT, AX, AB, BW, BX, CW, CX, FX, FZ, DE, DZ, DY, EZ, EY, WT, WX, WZ, XZ, XY, XT, TY, ZY.

2 hops: AC, AZ, AY, AF, BC, BZ, BY, BF, BT, CZ, CY, CF, CT, FD, FE, FY, FT, FW, DX, DT, DW, EX, ET, EW, ZT, YW.

3 hops: AE, AD, BD, BE, CD, CE $$hopt = (1 \times 23 + 2 \times 26 + 3 \times 6)/$$
$$(23 + 26 + 6) = 93/55$$
$$= 1.69 \text{ hops per optimum path}$$

With the assumption that the pre-selection of the usable links according to the present invention does not degrade the minimum hop constraint, the algorithm complexity can, in our example, be nearly reduced in a factor two:

C=hopt. 2L'=1.69×(2×13)=43.9 with:
L'=13 links
hopt=1.69 hops

This reduction of complexity can be much important typical networks. While the specification describes a preferred embodiment of the present invention, variations and modifications of the preferred embodiment will occur to those skilled in the art once they have read the specification. Therefore, it is intended that the appended claims shall be construed to cover not only the preferred embodiment, but all such variations and modifications as fall within the true spirit and scope of the invention.

We claim:

1. A network access node (300) for a packet switching communication network (200) having a plurality of nodes (201 ... 208) interconnected with transmission links (209), said network access node including:

means for receiving and transmitting data packets (301, 302, 304), a network topology database manager for storing and updating data representing the characteristics and attributes of nodes and transmission links, said data forming a topology database defining the network configuration (306), link selection means responsive to data contained in said topology database for identifying usable links for forming data paths with a destination node located in the network, said link selection means further including means for identifying each link in the network as either a backbone link or a local link, means for selecting as usable for a path determination all backbone links, means for selecting as usable for a path determination all local links attached to the network access node and to the destination node, and means for discarding as not usable for a path determination all other links, and means for storing link identifiers identifying selected links in the topology database; and means for determining, for a connection request to the destination node, an optimal routing path from said access node to the destination node using only said identified selected links.

2. A network access node according to claim 1 wherein said routing path determination further includes means for implementing a modified Bellmann-Ford algorithm in making the optimal routing path determination.

3. A method for selecting a routing path in a packet communication network (200) comprising a plurality of nodes (201 . . . 208) interconnected with transmission links (209), said method being performed in a network access node and including the steps of:

storing and updating data in a network topology database, said data representing characteristics and attributes of the nodes and transmission links and defining the network configuration, selecting links usable for forming data paths between the network access node and a destination node in the network, said selecting step including the further steps of using data stored in the network topology database to identify each link in the network as either a backbone link or a local link, selecting as usable for a path determination all backbone links, selecting as usable all local links attached to the network access node and to the destination node, discarding as not usable for a path determination all other links, and storing in the topology database link identifiers identifying all selected links, determining, for a connection request to the destination node, an optimal routing path from said access node to the destination node using only the identified selected links.

4. A method for selecting a routing path according to claim 3 wherein said routing path determining step includes the further step of determining the optimal routing path through application of a modified Bellman-Ford algorithm.

* * * * *